United States Patent
Lecerf et al.

(10) Patent No.: US 11,604,297 B2
(45) Date of Patent: Mar. 14, 2023

(54) HIGHLY-SPARSE SEABED ACQUISITION DESIGNS ADAPTED FOR IMAGING GEOLOGICAL STRUCTURE AND/OR MONITORING RESERVOIR PRODUCTION

(71) Applicant: PGS Geophysical AS, Oslo (NO)

(72) Inventors: Didier B. P. Lecerf, Rio de Janeiro (BR); Nizar Chemingui, Houston, TX (US)

(73) Assignee: PGS Geophysical AS, Oslo (NO)

( * ) Notice: Subject to any disclaimer, the term of this patent is extended or adjusted under 35 U.S.C. 154(b) by 118 days.

(21) Appl. No.: 17/237,435

(22) Filed: Apr. 22, 2021

(65) Prior Publication Data
US 2021/0239868 A1 Aug. 5, 2021

Related U.S. Application Data

(62) Division of application No. 15/152,175, filed on May 11, 2016, now Pat. No. 11,016,208.
(Continued)

(51) Int. Cl.
*G01V 1/20* (2006.01)
*G01V 1/38* (2006.01)

(52) U.S. Cl.
CPC .............. *G01V 1/20* (2013.01); *G01V 1/3808* (2013.01); *G01V 1/3852* (2013.01); *G01V 2210/16* (2013.01); *G01V 2210/169* (2013.01)

(58) Field of Classification Search
CPC ...... G01V 1/20; G01V 1/3808; G01V 1/3852; G01V 2210/16; G01V 2210/169
(Continued)

(56) References Cited

U.S. PATENT DOCUMENTS 2,906,363 A 9/1959 Clay
3,335,401 A 8/1967 Kerns
(Continued)

FOREIGN PATENT DOCUMENTS

EP 2669714 A2 4/2013
WO 03/083514 A1 10/2003
(Continued)

OTHER PUBLICATIONS

Search Report in GB1609100.1, dated Jul. 15, 2016, 2 pages.
(Continued)

*Primary Examiner* — Ian J Lobo

(57) ABSTRACT

Disclosed are advantageous designs for highly-sparse seabed acquisition for imaging geological structure and/or monitoring reservoir production using sea surface reflections. The highly-sparse geometry designs may be adapted for imaging techniques using the primary and higher orders of sea surface reflection and may advantageously allow for the use of significantly fewer sensors than conventional seabed acquisition. The highly-sparse geometry designs may be relevant to 3D imaging, as well as 4D ("time-lapse") imaging (where the fourth dimension is time). In accordance with embodiments of the invention, geophysical sensors may be arranged on a seabed to form an array of cells. Each cell in the array may have an interior region that contains no geophysical sensors and may be sufficiently large in area such that a 500 meter diameter circle may be inscribed therein.

20 Claims, 15 Drawing Sheets

Related U.S. Application Data

(60) Provisional application No. 62/168,974, filed on Jun. 1, 2015.

(58) Field of Classification Search
USPC .......................................................... 367/58
See application file for complete search history.

(56) References Cited

U.S. PATENT DOCUMENTS

| | | | |
|---|---|---|---|
| 4,499,565 A | 2/1985 | Fix et al. | |
| 5,168,472 A | 12/1992 | Lockwood | |
| 5,537,367 A | 7/1996 | Lockwood et al. | |
| 9,086,325 B2 | 7/2015 | Nash et al. | |
| 9,983,324 B2 * | 5/2018 | Brenders | G01V 1/3852 |
| 10,436,923 B2 * | 10/2019 | Rommel | G01V 1/3808 |
| 2009/0296518 A1 | 12/2009 | MacNeill et al. | |
| 2012/0113748 A1 | 5/2012 | Brune | |
| 2013/0013212 A1 | 1/2013 | Hatchell et al. | |
| 2013/0170317 A1 | 7/2013 | Stork | |
| 2014/0092708 A1 | 4/2014 | Cotton et al. | |
| 2015/0362611 A1 | 12/2015 | Lecerf et al. | |
| 2016/0170052 A1 | 6/2016 | Muijzert | |

FOREIGN PATENT DOCUMENTS

| | | |
|---|---|---|
| WO | 2010/075302 A2 | 7/2010 |
| WO | 2016/011250 A1 | 1/2016 |
| WO | 2016/089878 A1 | 6/2016 |
| WO | 2016/090031 A1 | 6/2016 |

OTHER PUBLICATIONS

Whitmore, et al., "Imaging of Primaries and Multiples Using a Dual-Sensor Towed Streamer," SEG Technical Program Expanded Abstracts 2010, pp. 3187-3193 (SEG 2010).

\* cited by examiner

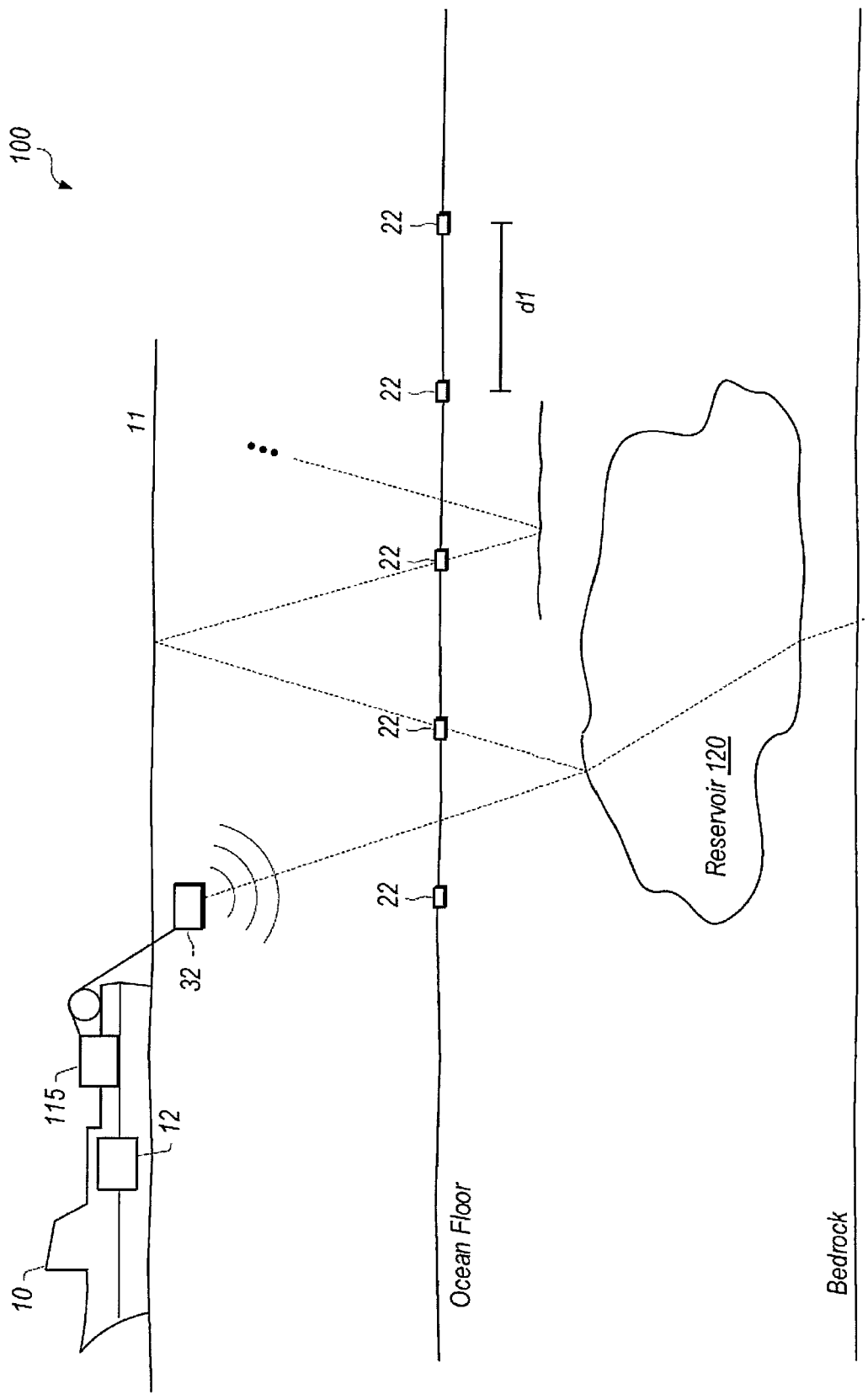

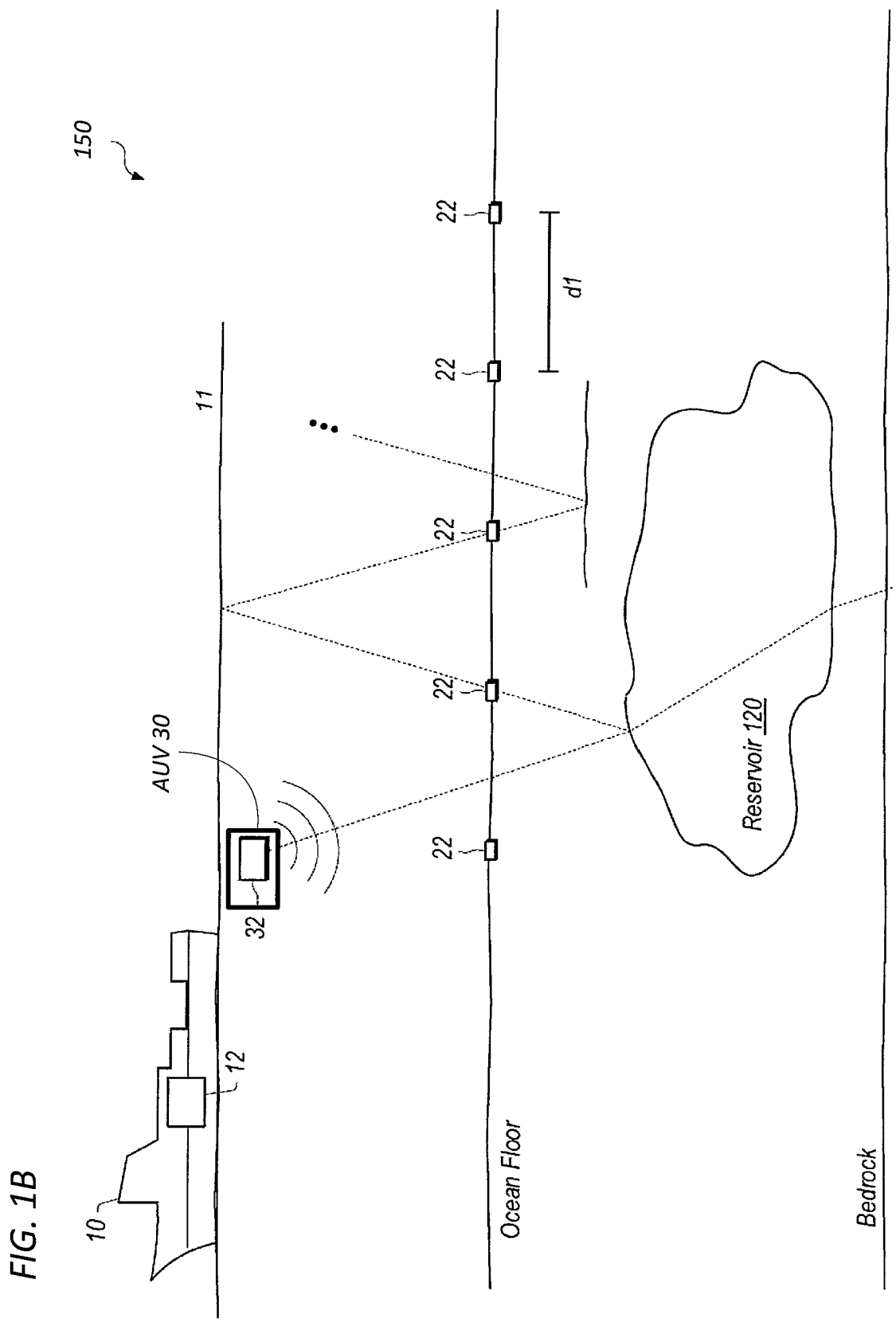

HIGHLY-SPARSE SEABED ACQUISITION DESIGNS ADAPTED FOR IMAGING GEOLOGICAL STRUCTURE AND/OR MONITORING RESERVOIR PRODUCTION

This application is a divisional application of U.S. patent application Ser. No. 15/152,175, filed on May 11, 2016, entitled "Highly-Sparse Seabed Acquisition Designs Adapted for Imaging Geological Structure and/or Monitoring Reservoir Production," which is incorporated by reference herein in its entirety. U.S. patent application Ser. No. 15/152,175 claims the benefit of U.S. Provisional Application No. 62/168,974, filed on Jun. 1, 2015, which is incorporated by reference herein in its entirety.

BACKGROUND

Geophysical surveys are often used for oil and gas exploration in geophysical formations, which may be located below marine environments. Various types of signal sources and geophysical sensors may be used in different types of geophysical surveys. Seismic geophysical surveys, for example, are based on the use of acoustic waves. In some seismic surveys, a survey vessel may tow an acoustic source (e.g., an air gun or a marine vibrator) and a plurality of streamers along which a number of acoustic sensors (e.g., hydrophones and/or geophones) are located. In other surveys, acoustic sensors are located on the seabed rather than being towed. This may be desirable in situations in which floating infrastructure prevents a streamer vessel from surveying an area, when wide-azimuth illumination is needed, and/or when imaging using shear-wave data is desired, for example.

Acoustic waves generated by the survey source may be transmitted to the earth's crust and then reflected back and captured at the towed and/or seabed geophysical sensors. Data collected during a marine geophysical survey may be analyzed to locate hydrocarbon-bearing geological structures, and thus determine where deposits of oil and natural gas may be located.

Four-dimensional (4D or "time-lapse") surveying involves surveying the same geophysical formation at different points in time, e.g., to determine changes in fluid saturation, pressure, etc. over time.

BRIEF DESCRIPTION OF THE DRAWINGS

FIG. 1A is a block diagram illustrating one embodiment of a geophysical survey system.

FIG. 1B is a block diagram illustrating another embodiment of a geophysical survey system.

DETAILED DESCRIPTION

Figure 2A:
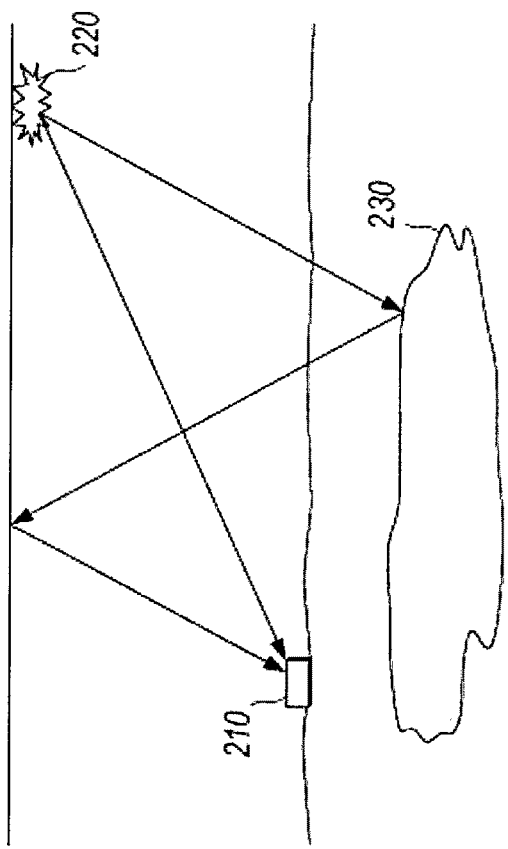
FIGS. 2A-2D are diagrams that illustrate exemplary seismic traces (or ray paths).

Seabed sensors may advantageously reduce variations between surveys, allowing high repeatability for 4D surveying (e.g., because receivers are fixed). However, it may be difficult and/or expensive to deploy and maintain large numbers of seabed sensors, so survey techniques using relatively sparse sensor arrays may be desirable.

The present disclosure provides highly-sparse geometry designs for seabed acquisition. These highly-sparse geometry designs are advantageously optimized for imaging geological structure (three-dimensional or 3D imaging), as well as monitoring hydrocarbon reservoirs (four-dimensional or 4D or "time-lapse" imaging, where the fourth dimension is time).

The 3D or 4D imaging is performed using primary and higher orders of sea surface reflected wavefields produced by a marine seismic source. Because higher orders of sea surface reflections provide extended illumination of the earth, such "imaging with multiples" techniques allow for the distance between seafloor seismic recording devices to be spread out, at least in one direction, without compromising the final image quality.

The receiver geometries disclosed herein are defined with a grid using a line separation of 500 meters or more. Different patterns are described herein for optimizing the geometry of the sparse receiver grid. These patterns may be applied to either ocean bottom cable (OBC) or ocean bottom nodes (OBN/OBS) in a 3D or 4D imaging context.

Initially, this disclosure describes, with reference to FIGS. 1A and 1B, an overview of a geophysical survey system. It then describes exemplary seismic traces with reference to FIGS. 2-3. Exemplary geophysical analysis techniques for seismic imaging are described with reference to FIGS. 4-5. The geophysical analysis techniques may include: switching source and receiver definition based on reciprocity, using higher-order reflections, separating up-going and down-going wavefields, deconvolution, cross-correlation and/or other techniques.

This disclosure presents and describes advantageous designs for highly-sparse seabed acquisition for imaging geological structure and/or monitoring reservoir production using sea surface reflections. Exemplary spacings of sensors for highly-sparse seabed acquisition are described with reference to FIGS. 6A-6C in accordance with embodiments of the invention. Furthermore, exemplary layout patterns for highly-sparse seabed acquisition are described with reference to FIGS. 7A-7D in accordance with embodiments of the invention.

Survey System Overview

Referring to FIG. 1A, a diagram illustrating one embodiment of a geophysical survey system 100 is shown. In the illustrated embodiment, system 100 includes survey vessel 10, signal source 32, and geophysical sensors 22.

Survey vessel 10 may be configured to move along the surface of body of water 11 such as a lake or the ocean, as shown. In the illustrated embodiment, signal source 32 is configured to transmit an acoustic signal. The illustrated dashed line shows a direction of travel for a portion of an acoustic wave-front generated by signal source 32. In the illustrated embodiment, the acoustic signal proceeds through the ocean floor and is reflected by reservoir 120, the ocean surface (an air/water interface), and a reflector located above reservoir 120.

Survey vessel 10 may include equipment, shown generally at 12 and for convenience collectively referred to as "survey equipment." Survey equipment 12 may include devices such as a data recording unit (not shown separately) for making a record of signals generated by various geophysical sensors in the system 100. Survey equipment 12 may also include navigation equipment (not shown separately), which may be configured to control, determine, and record, at selected times, the geodetic positions of: survey vessel 10, signal source 32, and/or other survey elements. Geodetic position may be determined using various devices, including global navigation satellite systems such as the global positioning system (GPS), for example. In some embodiments, vessel 10 is configured to tow one or more seismic streamers (not shown).

In the geophysical survey system 100 shown in FIG. 1A, survey vessel 10 tows a single signal source 32. In various embodiments, survey vessel 10 may tow any appropriate number of signal sources, including as few as none or as many as 6 or more. The location of the signal sources may be centered behind survey vessel 10 or displaced from the center line, and may be at various distances relative to survey vessel 10, including attached to the hull. Signal sources may be any type of signal source known in the art. Signal source 32 may include an array of multiple signal sources. For example, signal source 32 may include a plurality of seismic sources (e.g., air guns). The term "signal source" may refer to a single signal source or to an array of signal sources. In the illustrated embodiment, signal sources 32 are each coupled to survey vessel 10 at one end through winch 115 or a similar spooling device that enables changing the deployed length of a signal source cable. Survey equipment 12 may include signal source control equipment (not shown separately) for selectively operating and maneuvering signal source 32. While one survey vessel towing one source is shown in FIG. 1A, multiple survey or source vessels towing one or more sources may also be used in other implementations.

In an alternate embodiment depicted in FIG. 1B, instead of being towed by a survey vessel 10, the signal source or sources 32 may be deployed on one or more underwater vehicles (UV) 30 such as autonomous underwater vehicles (AUVs) or Remotely Operated Vehicles (ROVs). Each UV 30 is a robotic vehicle that may travel underwater without needing to be steered by an operator located on or within the vehicle. The UV 30 may communicate with survey equipment 12 of a survey vessel 10.

Geophysical sensors 22 may be referred to as seabed sensors and may be any type of geophysical sensor known in the art. Examples include hydrophones and/or geophones in some embodiments. Non-limiting examples of such geophysical sensors may include particle motion responsive seismic sensors such as geophones and accelerometers, pressure responsive seismic sensors such as hydrophones, pressure-time-gradient responsive seismic sensors, electrodes, magnetometers, temperature sensors, fiber optic sensors, or combinations of the foregoing. In various implementations of the disclosure, geophysical sensors 22 may measure, for example, seismic energy indicative of the response of various structures in the Earth's subsurface formation below the bottom of body of water 11 to energy imparted into the subsurface formation by one or more of signal source 32. Seismic energy, for example, may originate from signal source 32, or an array of such signal sources, deployed in body of water 11 and towed by survey vessel 10 as illustrated in FIG. 1A or deployed via one or more autonomous underwater vehicle 30 as illustrated in FIG. 1B.

In some embodiments, geophysical sensors 22 (which may also be referred to as receivers) are configured to store data until they are physically retrieved, at which point the stored data may be accessed. In other embodiments, geophysical sensors 22 may be configured to communicate with survey equipment onshore or with survey vessel 10 wirelessly or using transmission cables. Geophysical sensors 22 may include relatively stable and/or synchronized clocks to timestamp recorded data. Geophysical sensors 22 may be comprised in ocean bottom cables (OBC) and linked together or may be ocean bottom nodes (OBN) and be individual recording systems (e.g., with a clock, battery, sensor, and data/time recorder integrated within each unit). In the illustrated embodiment, two of geophysical sensors 22 are located distance dl apart. In some embodiments, the disclosed geophysical analysis techniques may allow sparse deployment of geophysical sensors 22, e.g., with separation between sensors of 500 meters or more.

Survey equipment 12, in one embodiment, includes a computing system (not shown separately) configured to, inter alia, process data from geophysical sensors 22. In other embodiments, a computing system at another location may perform geophysical analysis on data gathered by geophysical survey system 100 (e.g., on land after a survey has been conducted). A computing system may include or be configured to access a non-transitory storage medium having instructions stored thereon that are executable to cause the system to perform various operations described herein. A computing system may include one or more processors configured to execute the program instructions.

Overview of Reflected Signals

FIGS. 2A-2D show examples of seismic signals received by a seabed geophysical sensor. As shown, the signals are generated by a source 220 and arrive at a seabed sensor 210 located on the ocean floor. Acoustic signals propagating up toward the ocean surface are referred to as "up-going" wavefields while signals propagating down toward the ocean floor are referred to as "down-going" wavefields. A particular seismic trace/signal may be reflected multiple times and thus be up-going and down-going at different times during travel. However, a given signal is typically referred to as up-going or down-going based on whether it is up-going/down-going when arriving at a receiver. Note that typically, the air/water interface reflects an acoustic wave with a reflection coefficient close to minus one. Thus, the interface behaves like a mirror with a polarity change and small energy loss. As used herein, the term "seabed sensor" refers to a geophysical sensor that is positioned on, buried in, or otherwise attached to the seafloor (e.g., rather than being included in a streamer towed by a survey vessel). In some embodiments, the sensors themselves may not be in contact with the seafloor but are maintained at a fixed depth above the seafloor.

In the example of FIG. 2A, sensor 210 receives both a direct signal (from source 220 to receiver 210) and a primary reflection. As used herein, a "primary" reflection refers to a signal reflected by a location in a geophysical formation that is being imaged, and not reflected by other geophysical layers or the air/water interface. Traditionally, primary reflections have been used for imaging geophysical formations while other reflections have been removed from survey data before imaging, using various de-multiple techniques.

Figure 2B:
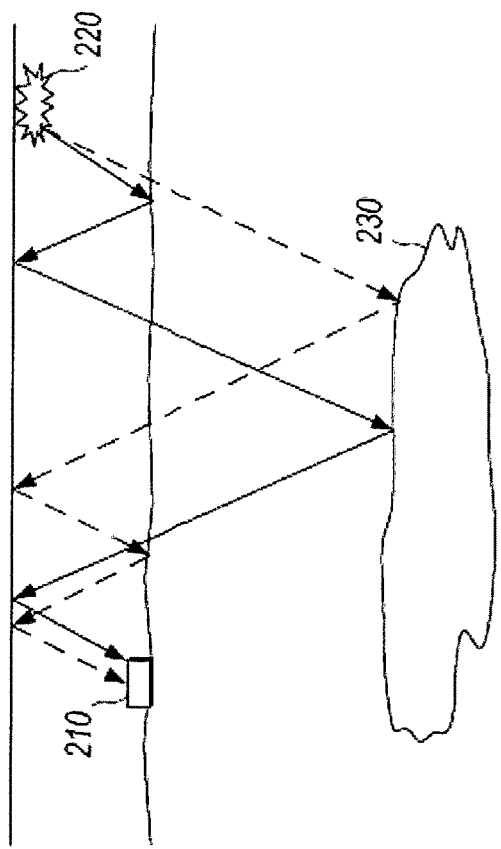

In the example of FIG. 2B, sensor 210 receives both a direct signal and a mirrored signal reflected from both geophysical formation 230 and the ocean surface. Imaging using such a mirrored signal (a down-going signal reflected once by the air/water interface before arriving at a sensor) may be referred to as "mirror imaging." In the illustrated example, the signal reflected from the air-water interface may be referred to as a receiver-side peg leg (a signal reflected from the air/water interface or a geophysical layer other than the location being imaged), which is received as a down-going signal in the illustrated example. Mirror imaging may allow imaging of locations other than a mid-point between source and receiver, as shown in FIG. 2B, in which a location that reflects the signal in geophysical formation 230 is located closer to source 220 than a mid-point between source 220 and sensor 210. Note that, because of the level difference between the source and the receiver, the reflection is shifted from the mid-point with the primaries (as well), especially with deep water acquisitions.

Figure 2C:
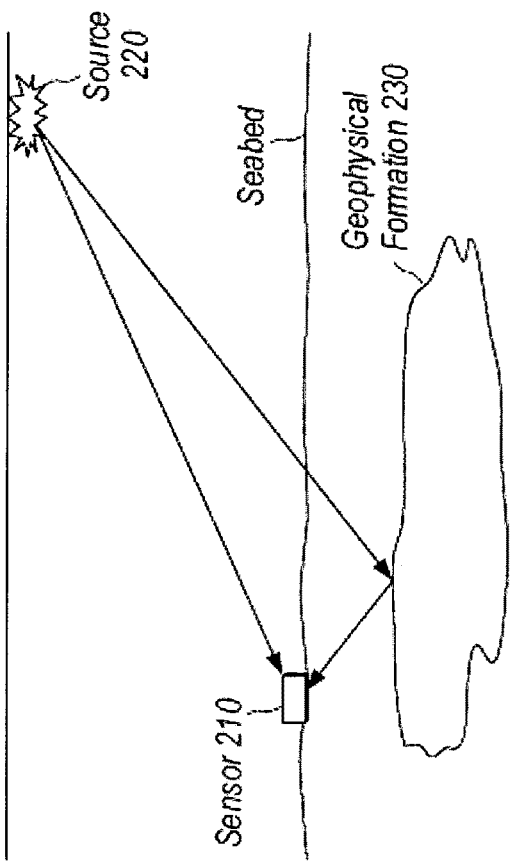
Figure 2D:
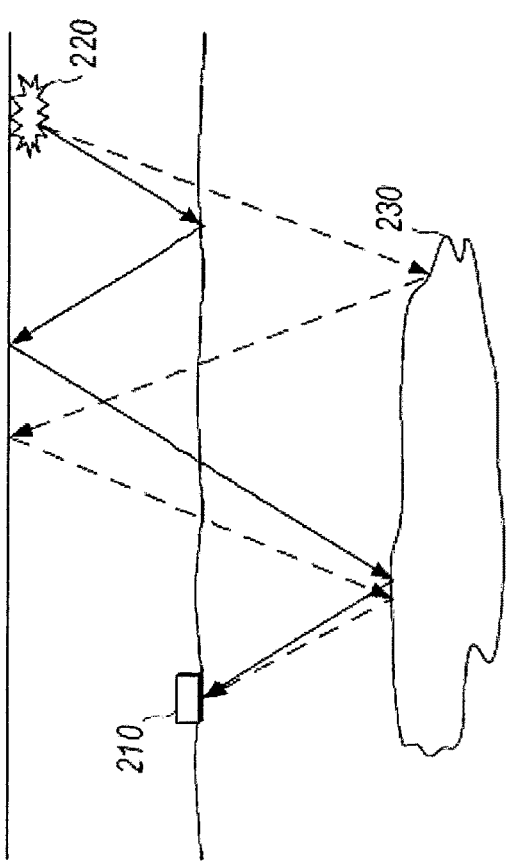

In the examples of FIGS. 2C and 2D, sensor 210 receives higher-order reflections in up-going and down-going wavefields respectively. As used herein "higher-order" reflections refer to up-going signals reflected at least once by an air/water interface or down-going signals reflected at least twice by the air-water interface. Thus, primary reflections and reflections used in mirror imaging are not higher-order reflections.

In FIG. 2C, the solid line illustrates a signal that includes a source-side peg leg. In FIG. 2D, the solid line indicates a signal that includes both source and receiver-side peg legs, while the dashed line indicates a signal that includes a receiver-side peg leg.

As mentioned above, in traditional imaging techniques, various de-multiple algorithms may be used to remove higher-order reflections from survey data before imaging a geophysical formation. However, in various embodiments described herein, one or more types of higher-order multiples/reflections are not removed from survey data and are processed during imaging. Geophysical analysis using higher-order multiples may allow for a greater survey illumination area (greater coverage of the geophysical formation). For example, a primary reflection typically provides data only for a location at a midpoint between a source and receiver. However, higher-order multiples may include data for points much nearer to the source, increasing illumination area based on source coverage.

Wavefield Separation Overview

In various embodiments, up-going and down-going wavefields may be separated before imaging and/or other geophysical analysis. Typically, wavefield separation is performed based on data from multiple types of sensors. For example, pressure sensors (e.g., hydrophones) that measure pressure (P) as a scalar and particle-velocity sensors (e.g., geophones) that measure particle velocity (Z) as a vector are used in some embodiments. In these embodiments, a given seabed sensor 210 may include both pressure and particle-velocity sensors. Because the up-going wavefield is in-phase for both pressure and particle-velocity records, it may be extracted by summing the two measurements (PZ-summation) after calibration while the down-going wavefield is canceled because it is out-of-phase on P compared to Z. Similarly, the down-going wavefield may be extracted by determining the difference between the P and calibrated Z.

Traditional geophysical analysis for seabed sensors uses only the up-going wavefield, e.g., because it contains less sea-surface reflections (the down-going wavefield includes air/water surface reflected waves by definition). However, using the down-going wavefield as well may improve illumination of the water bottom and shallow structures. Thus mirror imaging uses the down-going wavefield and primary signal reflected once by the air/water interface. In various embodiments, higher-order reflections are used in imaging based on both up-going and down-going wavefields.

Separately processing up-going and down-going wavefields may have various advantages over geophysical analysis without separation, such as reduced imaging noise due to cross-talk (e.g., constructive interference of some artefacts). The PZ-summation used to generate the up-going wavefield may also remove some receiver-side peg legs. However, in some embodiments, wavefield separation is not performed. This may allow use of single-component sensors, e.g., hydrophones rather than multi-component sensors, which may reduce sensor cost.

Reciprocity Overview

FIGS. 3A-3D show examples of survey traces used to image location 350 and application of the reciprocity theorem, according to some embodiments. Sources 320 may be different seismic source modules or may represent different shot locations for a given source module. In some embodiments, sensor 310 is configured similarly to sensor 210, as described above with reference to FIGS. 2A-2D. As shown, the signals in FIGS. 3A and 3B include receiver-side peg legs.

The reciprocity theorem states that, under certain conditions, the interchange of seismic source and receiver yields identical displacement fields. For example, consider equation (1) for the vertical component of particle velocity:

$$v(t,x_s,x_r)=R(t,x_r)*G(t,x_s,x_r)*S(t,x_s) \qquad (1)$$

where $x_s$ and $x_r$ are source and receiver positions respectively, R is the receiver response for vertical component recordings, S is the source signature, and G is Green's function (e.g., the corresponding medium response), and the asterisk (*) denotes convolution in the time domain. For equation (1), reciprocity of the medium response may be expressed using equation (2):

$$G(t,x_s,x_r)=G(t,x_r,x_s) \qquad (2)$$

Equations (1) and (2) are provided as non-limiting examples. In various embodiments, reciprocity may be applied to any of various other appropriate equations for seismic wave propagation, e.g., for pressure and/or particle velocity measurements.

Figure 3A:
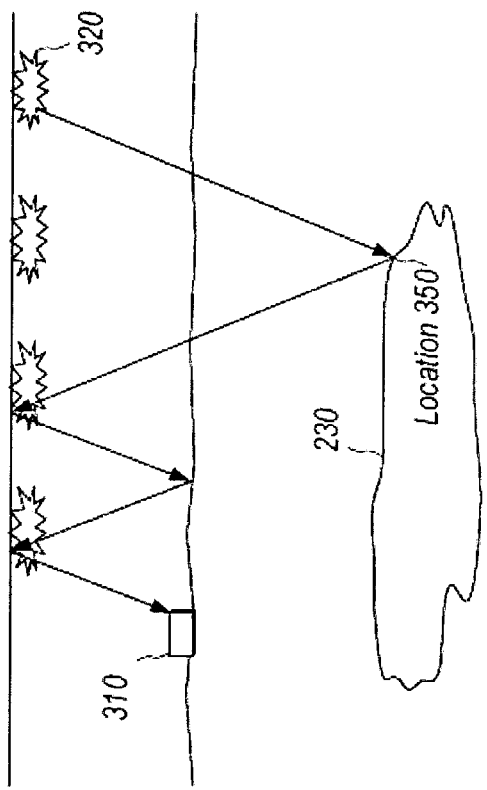
FIGS. 3A-3B illustrate exemplary seismic traces (or ray paths) and FIGS. 3C-3D illustrate interchange of source and receiver definitions, according to one embodiment.
Figure 3B:
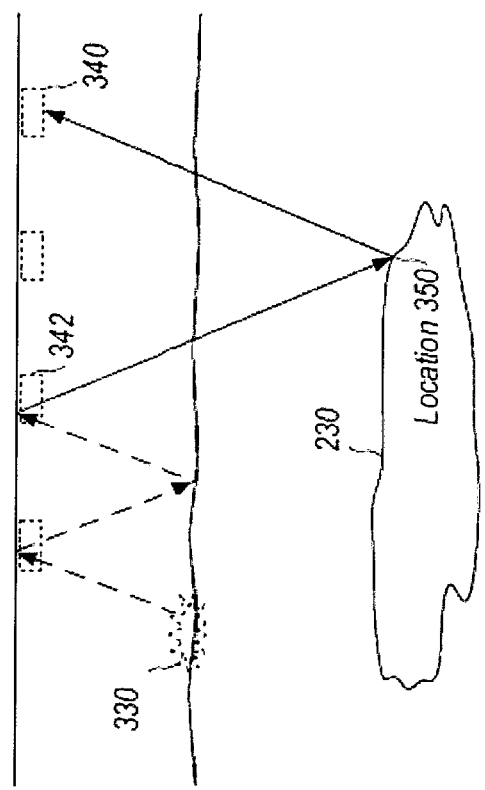
Figure 3C:
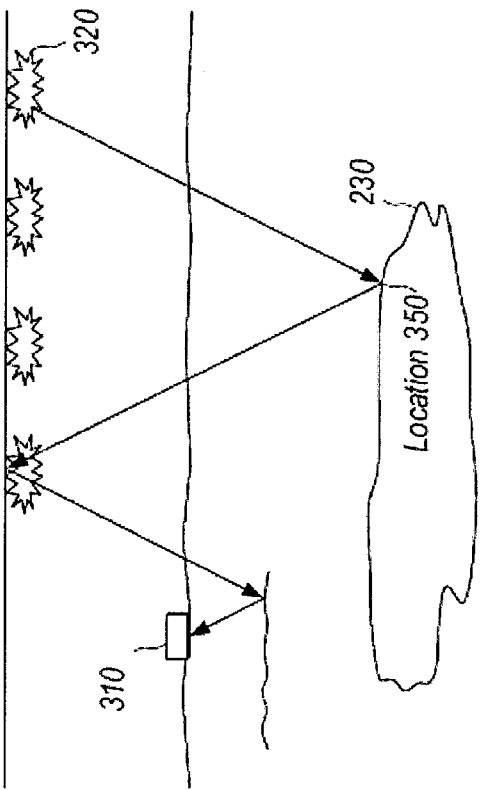
Figure 3D:
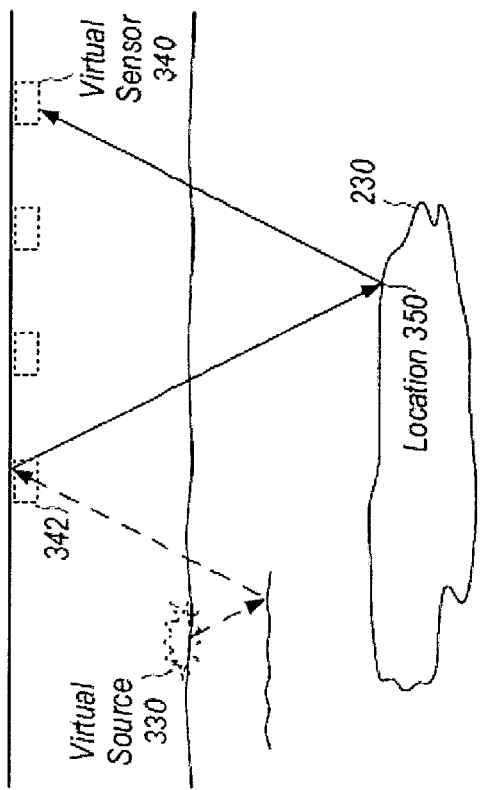

In the illustrated example, the traces shown in FIGS. 3A and 3B may be part of seismic gathers for location 350. In the illustrated embodiment, the seismic gathers are modified for at least the illustrated traces (of FIGS. 3A and 3B) by interchanging source and sensor definition, such that the resulting gathers include data representing signals generated using a virtual source 330 and captured using one or more of virtual receivers 340 (as shown in FIGS. 3C and 3D). In this embodiment, time propagation may become negative based on the interchange of source/receiver definition.

As used herein, source and receiver/sensor "definitions" refer to data that indicates at least position information for a source or receiver/sensor. Source and receiver definitions may also include other information about sources or receivers/sensors such as source signature information, for example. Thus, inverting or interchanging source and sensor definition for a particular source/sensor pair may result in data representing a signal generated by virtual source at the position of the sensor (which may have one or more attributes of the original source such as signature, etc.) and received by a virtual sensor at a position of the source (which may in turn have one or more attributes of the original sensor).

As used herein, a seismic "gather" refers to a set of one or more seismic traces that share a common attribute. Examples include common shot gathers, common receiver gathers, common midpoint gathers, common depth point gathers, etc. Determining a seismic gather for a particular location in a geophysical formation involves determining a set of one or more traces reflected from the location.

Exemplary Imaging Techniques Using Higher-Order Multiples and Reciprocity

Still referring to FIGS. 3C and 3D, in some embodiments, deconvolution or cross-correlation is used to image location 350 using data representing one or more of the exemplary traces/signals shown (e.g., after inverting source-sensor definition).

In one embodiment, in order to image location 350, a geophysical analysis system is configured to deconvolve two sets of data to image location 350. Referring to FIG. 3C, in this embodiment, the first data represents the signal originating from virtual source 330 and arriving at virtual sensor 340 (shown using both the dashed and solid lines in FIG. 3C). In this embodiment, the second data represents the signal originating from virtual source 330 and arriving at virtual sensor 342 (shown using the dashed lines in FIG. 3C). This deconvolution may be similar to imaging using a source-receiver pair located at the positions of virtual sensors 342 and 340.

In these embodiments, a similar deconvolution may be performed for the signals in FIG. 3D (e.g., deconvolving data representing the complete signal, including both dashed and solid traces, with data representing the dashed traces). Speaking generally, in some embodiments, deconvolution is performed for two sets of data. In these embodiments, the first data represents a signal initiated from a virtual source (e.g., virtual source 330), reflected one or more times before being reflected at a first virtual receiver (e.g., virtual sensor 342), reflected by the location in the geophysical formation (e.g., location 350), and arriving at a second virtual receiver (e.g., virtual sensor 340). In these embodiments, the second data represents a signal initiated from the virtual source and reflected one or more times before arriving at the first virtual receiver. Note that, in some embodiments, the position of virtual sensor 342 may not correspond to the actual position of a physical source during a survey. Rather, in various embodiments, signal corrections and/or interpolations may be used to generate data corresponding to virtual sources and/or receivers at various positions.

In other embodiments, geophysical analysis equipment is configured to perform cross-correlation in order to image location 350. In this embodiment, the crosscorrelation of first data representing a signal received at virtual sensor 342 and second data representing a signal received at virtual sensor 340 may provide the medium response (e.g., Green's function) of location 350, similar to imaging using a source-receiver pair located at the positions of virtual sensors 342 and 340.

The geophysical analysis techniques described herein may provide various advantages over conventional imaging techniques. These advantages may reduce equipment costs, reduce survey time, reduce processing time, and/or improve survey accuracy, resulting in competitive advantages in the geophysical surveying industry.

As a first example, imaging using higher-order multiples may reduce processing time for geophysical analysis because it avoids the need for de-multiple algorithms, which can be complex and use significant processing time.

Further, imaging using higher-order multiples increases illumination area, in some embodiments. Each order of multiple/reflection for a given wave front has different reflection points, allowing imaging of locations that may be unreachable using traditional imaging (e.g., using only primaries and/or mirror imaging).

Still further, using reciprocity means that the illumination area may be defined by the surface distributions of the survey source(s) and the maximum order of multiples recorded. Thus, the illumination area may be increased, in some embodiments, by increasing the coverage of the survey source(s) and/or increasing sensor recording time to record additional multiple arrivals. This may allow for flexibility in sensor geometry and survey planning. For example, sparse arrays of seabed sensors may be used because of the increased illumination area and ability to manipulate the illumination area by changing source coverage. In these embodiments, seabed sensors in a sparse array may be located 500 meters or more apart, for example. In various embodiments, sensor deployment, sensor geometry, survey procedures, etc. may be determined based on the disclosed geophysical analysis techniques. Further, steering the seismic source allows flexibility in generating virtual sensors to control the illumination area while the virtual sources remain stationary. This may allow increased survey repeatability, which is important for 4D surveys.

Still further, imaging using reciprocity and deconvolution may avoid any need to perform de-signature processing for the source. The source term may be reduced because the wavefields share the same convolutive source signature. The source signal may be zero-phased and any bubble effect may be cancelled in the imaging output. This may also allow increased survey repeatability, e.g., for 4D surveys.

Still further, separately imaging up-going and down-going wavefields may attenuate uncorrelated cross-talk artifacts. Also, various sources of noise in 4D surveys (e.g., source depth, bubble fluctuations, phase rotation, receiver coupling, etc.) may be canceled out by the disclosed techniques.

Figure 4:
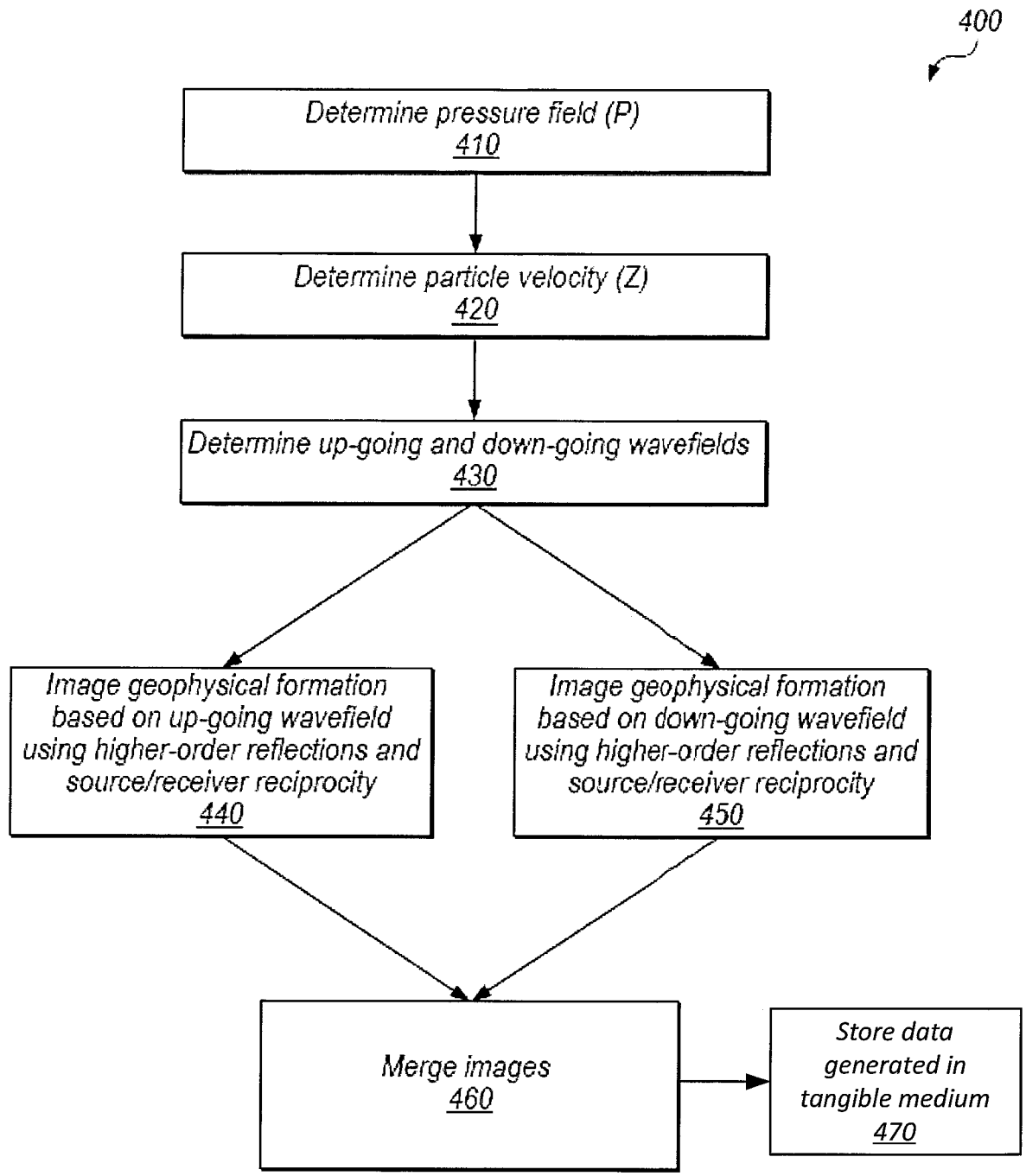
FIG. 4 illustrates one embodiment of a method for seismic imaging that includes separating up-going and down-going wavefields.

Referring now to FIG. 4, a flow diagram illustrating one embodiment of a method for seismic imaging is shown. The method shown in FIG. 4 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 410.

At block 410, a pressure field P is determined. In some embodiments, a computing system is configured to determine the pressure field based on measurement data from one or more pressure sensors generated during a seismic survey. In various embodiments, the pressure field is based on reflections of seismic waves from a geophysical formation. Flow proceeds to block 420.

At block 420, particle velocity data is determined. In some embodiments, velocity is derived from recorded acceleration data and/or change in pressure data is derived from recorded pressure information in order to process data from pressure sensors and particle velocity sensors in the same mode (e.g., velocity and pressure or acceleration and change in pressure). In some embodiments, a computing system is configured to determine the particle velocity data based on received measurement data, where the measurement data was previously generated during the seismic survey. In other embodiments, the determining of blocks 410 and 420 includes performing the seismic survey to generate pressure field and particle velocity data. Flow proceeds to block 430.

At block 430, up-going and down-going wavefields are separated, e.g., by computing the summation and difference between the P and Z fields, as discussed above. Flow proceeds in parallel to blocks 440 and 450.

At block 440, the geophysical formation is imaged based on data for the up-going wavefield, using higher-order reflections and source/receiver reciprocity, e.g., as described above with reference to FIGS. 3C and 3D. Flow proceeds to block 460.

At block 450, the geophysical formation is imaged based on data for the down-going wavefield, using higher-order reflections and source/receiver reciprocity, e.g., as described above with reference to FIGS. 3C and 3D. Flow proceeds to block 460.

At block 460, the images generated in blocks 440 and 450 are merged to generate a final image of the geophysical formation. The merging may include averaging the two images, for example. In other embodiments, any of various appropriate techniques including various weightings may be used to combine the images. Flow may proceed to block 470.

At block 470, the final image of the geophysical formation, and other data relating to the geophysical formation that was generated by the method of FIG. 4, may be stored in a tangible medium. The tangible medium with the stored data from the method of FIG. 4 may be provided as a geophysical data product.

Figure 5:
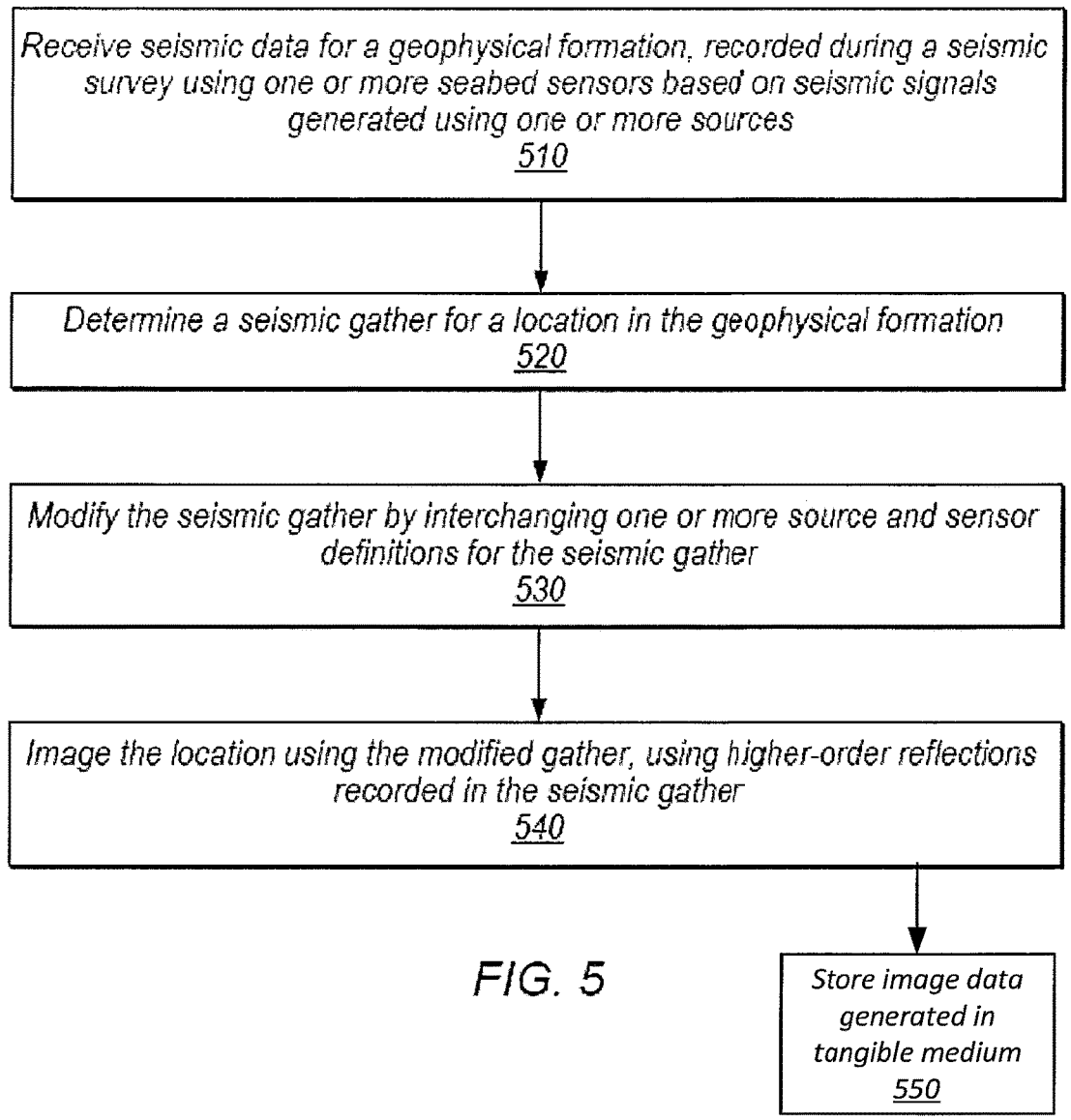
FIG. 5 illustrates one embodiment of a method for seismic imaging that includes interchanging source-receiver definition and using higher-order multiples.

Referring now to FIG. 5, a flow diagram illustrating one embodiment of a method for seismic geophysical analysis is shown. In some embodiments, the steps of blocks 510 to 540 of FIG. 5 are utilized to perform the operations of blocks 440 and 450 of FIG. 4 to generate separate images of the geophysical formation based on up-going and down-going wavefields.

The method shown in FIG. 5 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 510.

At block 510, seismic data for a geophysical formation is received. In this embodiment, the seismic data is generated during a seismic survey using one or more seabed sensors based on seismic signals generated using one or more sources. The seismic data may be retrieved from the seabed sensors using any of various appropriate techniques. Flow proceeds to block 520.

At block 520, a seismic gather is determined for a location in the geophysical formation. In some embodiments, the seismic gather includes data for a plurality of reflections from the location. In some embodiments, the seismic gather includes data from a plurality of seabed sensors and/or generated based on signals from a plurality of source locations. In some embodiments, the seismic gather includes data representing higher-order reflections for the location. In some embodiments, the seismic gather does not include a primary reflection for the location in the geophysical formation. In some embodiments, gathers are generated for various locations in the geophysical formation, e.g., in order to image the entire geophysical formation. Thus, the disclosed techniques may be used for a plurality of locations in the geophysical formation, in some embodiments. Flow proceeds to block 530.

At block 530, the seismic gather is modified by interchanging one or more source and sensor definitions for the seismic gather. For example, in some embodiments, the interchange generates data representing a signal generated by a virtual source located at a position of one of the seabed sensors and received by a virtual sensor located at a position of one of the one or more sources. Exemplary embodiments of interchanging source-receiver definition are described above, with reference to FIGS. 3C and 3D. Flow proceeds to block 540.

At block 540, the location is imaged using the modified gather, using higher-order reflections recorded in the seismic gather. The imaging may include determining the impulse response of the geophysical formation at the location. Imaging using higher-order reflections may increase illumination area, facilitating surveys using sparse arrays of seabed sensors, in some embodiments. Inverting source-receiver definition may facilitate imaging of locations located nearer to a source than to a sensor, using higher-order multiples, in some embodiments. Flow may proceed to block 550.

At block 550, in some embodiments, the image data that was generated by the step of block 540 may be stored in a tangible medium. The tangible medium with the stored image data may be provided as a geophysical data product.

Survey and Survey Planning Techniques

The pattern of an array of seabed sensors for a survey may be determined in advance in order to generate data usable to perform the disclosed geophysical analysis techniques. The pattern may specify distances between sensors, sensor orientation, shot area, etc.

Various survey actions may be taken in order to generate data for the disclosed geophysical analysis techniques. For example, one or more sources may be steered to generate a desired defined illumination area, using higher-order multiples. As another example, receiver acquisition times and parameters may be configured, e.g., in order to record long enough to capture higher-order multiples for desired locations in a geophysical formation.

Exemplary Spacings and Layout Patterns for Highly-Sparse Seabed Acquisition

This section describes exemplary geometries (including spacings and layouts) of sensors for highly-sparse seabed acquisition. The disclosed highly-sparse geometries have various advantages compared with conventional seabed geometries.

One advantage of the disclosed highly-sparse geometries is substantially reduced deployment costs. Conventional seabed imaging uses a relatively dense seabed recording system with much less than 500 meters between sensor lines. Such a dense seabed recording system works well with imaging using primary wavefields only and mirror imaging using first order receiver peg-leg wavefields. However, to deploy the dense seabed recording system is costly, especially for large areas or in deep waters.

In contrast, the highly-sparse geometries disclosed herein are much less costly to deploy. Moreover, despite the substantially fewer sensors in a highly-sparse geometry, the seismic image quality may be maintained by using an "imaging with multiples" process in which every shot pair is transformed into a virtual sea-surface source-receiver couple. With this transformation, the area illuminated is essentially defined by the surface distribution of the seismic sources and the maximum order of multiples recorded.

A further advantage is that the disclosed highly-sparse geometries are well suited for a seabed with a subsea installation, such as a well head, production pump, or subsea pipes, for example. This is because the obstruction due to the subsea installation can be bypassed by deploying the sensors around it. The highly-sparse recording system is also less sensitive to seismic noise that is potentially generated by the subsea installation. This is because the sensors may be located further from the installation in a quieter seabed environment for better 3D/4D signal detection.

Note that, for ease of understanding the highly-sparse geometries, receiver lines connecting the sensors are depicted in FIGS. 6A-6C and FIGS. 7A-7D. These receiver lines may be ocean bottom cables (OBC) that link sensors together.

Figure 8:
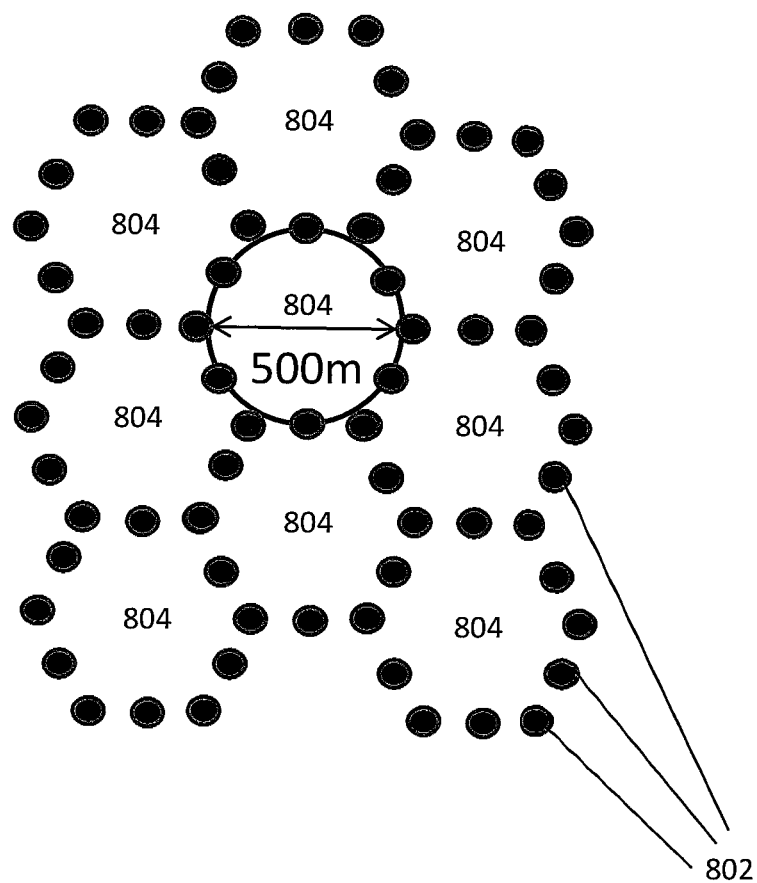
FIG. 8 illustrates an exemplary layout pattern of ocean bottom nodes for highly-sparse seabed acquisition in accordance with embodiments of the invention.

However, the highly-sparse geometries may also be implemented without receiver lines using ocean bottom nodes (OBN). An ocean bottom node includes an individual recording system (e.g., with a clock, battery, sensor, and data/time recorder integrated within each unit) and may record data locally and/or communicate data wirelessly using a high-speed acoustic communication system. In embodiments using OBN (instead of OBC), the OBN are deployed separately at spaced positions without using actual receiver lines. An exemplary highly-sparse geometry using OBN 802 is depicted in FIG. 8. As depicted, the OBN 802 are spaced in a highly-sparse manner such that there are regions 804 that are devoid of OBN 802. As shown, a circle of diameter 500 meters (or more) may be inscribed within these regions 804. In the particular geometry depicted, the OBN 802 are positioned along virtual lines that form a hexagonal grid.

Figure 6A:
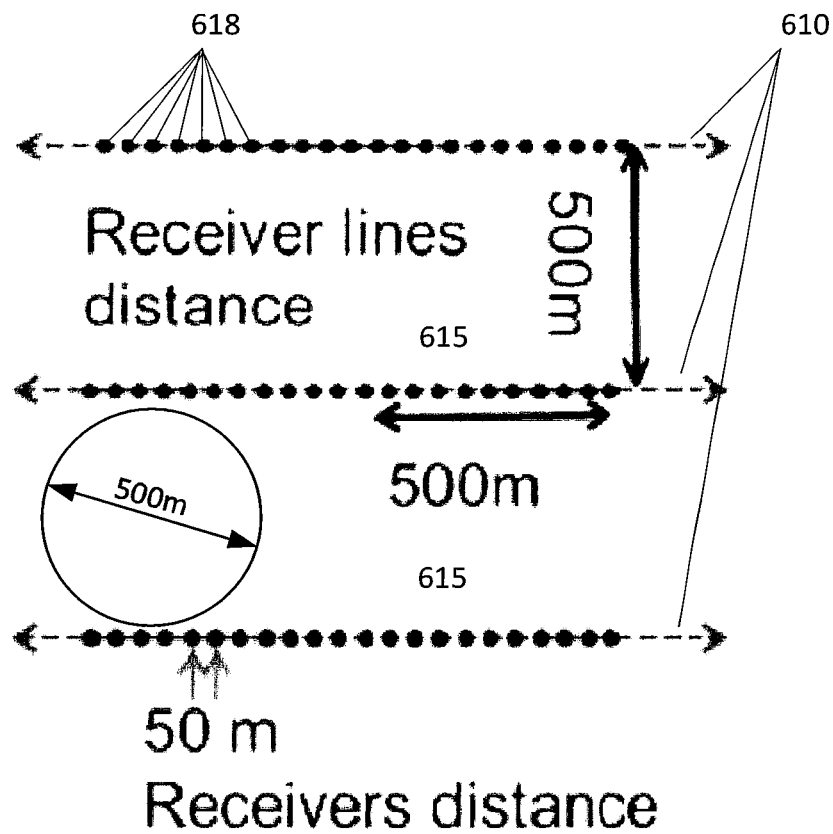
FIG. 6A illustrates a first exemplary spacing of sensors for highly-sparse seabed acquisition in accordance with embodiments of the invention.
Figure 6B:
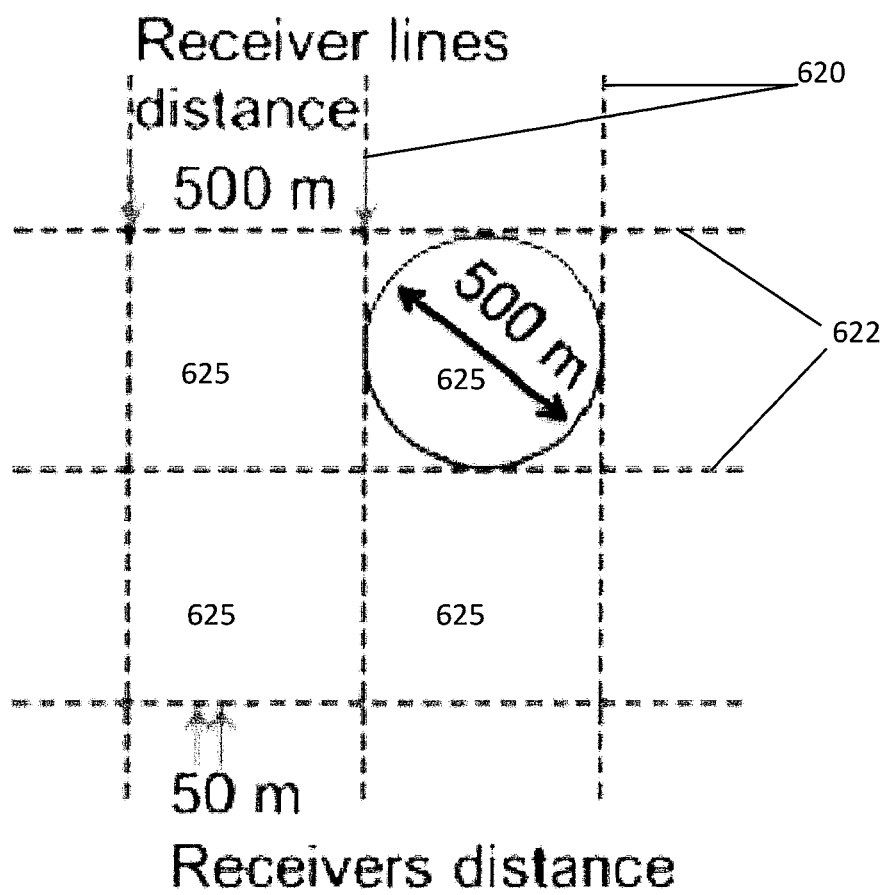
FIG. 6B illustrates a second exemplary spacing of sensors for highly-sparse seabed acquisition in accordance with embodiments of the invention.
Figure 6C:
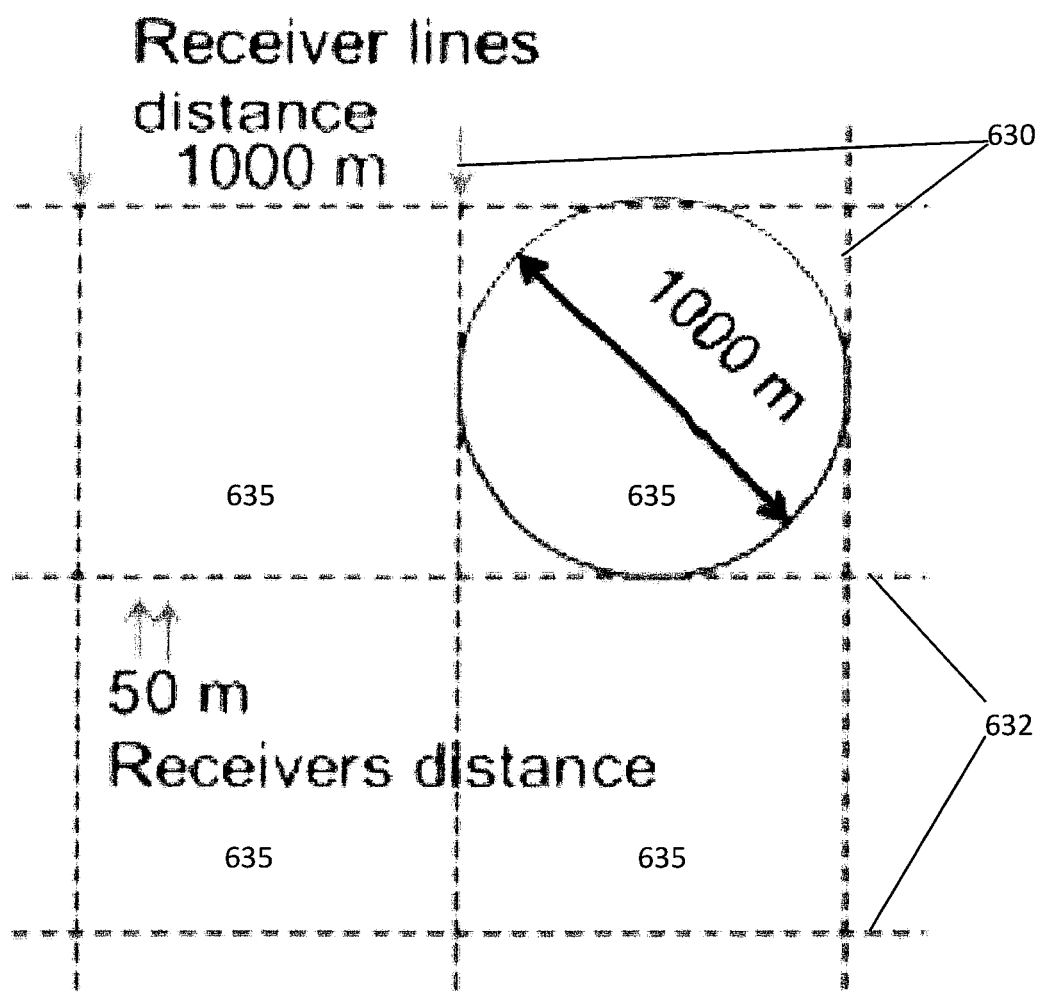
FIG. 6C illustrates a third exemplary spacing of sensors for highly-sparse seabed acquisition in accordance with embodiments of the invention.

FIGS. 6A-6C illustrate three exemplary arrangements of sensors 618 for highly-sparse seabed acquisition in accordance with embodiments of the invention. Each arrangement uses sensors arranged in a highly-sparse geometry.

As depicted in FIG. 6A, the distance between consecutive (adjacent) sensors 618 on each receiver line 610 may be, for example, 50 meters. Other distances between consecutive sensors may be used. A preferred range of the distance between consecutive sensors is from 25 to 100 meters for OBC and from 100 to 400 meters for OBN. The particular distance used between consecutive sensors along a receiver line may be determined by the desired fold of the seismic data. For ease of illustration, although the sensors are not depicted in FIGS. 6B and 6C, the sensors are positioned on each receiver line in FIGS. 6B and 6C in a similar manner as shown in FIG. 6A.

In FIG. 6A, the plurality of receiver lines 610 are in a parallel arrangement and spaced apart by at least 500 meters (which is substantially longer than the spacing between consecutive sensors on a single line). In other words, in the direction perpendicular to the receiver lines 610, the sensors 618 are spaced apart by at least 500 meters. With this large spacing between receiver lines 610, sensors 618 on one line 610 are at least 500 meters away from sensors 618 on neighboring lines. Note that a circle with a diameter of at least 500 meters may be fit into the stripe region 615 between consecutive receiver lines 610, where the area of the circle does not include any sensors 618.

In FIG. 6B, the plurality of receiver lines forms a two-dimensional (2D) grid of parallel vertical lines 620 and parallel horizontal lines 622. The parallel vertical lines 620 are spaced apart by at least 500 meters. The parallel horizontal lines 622 are also spaced apart by at least 500 meters. With this arrangement of receiver lines, 2D cells 625 are formed in the open spaces between the receiver lines, each cell 625 being bordered by two adjacent vertical lines and two adjacent horizontal lines. A circle with a diameter of at least 500 meters may be fit into each 2D cell 625, where the area of the circle does not include any sensors.

In FIG. 6C, the plurality of receiver lines forms a two-dimensional (2D) grid of parallel vertical lines 630 and parallel horizontal lines 632. In this case, the parallel vertical lines 630 are spaced apart by at least 1000 meters (1 kilometer). The parallel horizontal lines 632 are also spaced apart by at least 1000 meters (1 kilometer). With this arrangement of receiver lines, 2D cells 635 are formed in the open spaces between the receiver lines, each cell being bordered by two vertical lines and two horizontal lines. A circle with a diameter of at least 1000 meters (1 kilometer) may be fit into each 2D cell 635, where the area of the circle does not include any sensors.

The arrangements in FIGS. 6A-6C contrast with conventional arrangements of sensors for three-dimensional (3D) seabed seismic acquisition, where the spacing generally is less than 500 meters between receiver lines. In a conventional 3D seabed seismic geometry, there is no such large area without sensors (i.e. that could fit a circle of at least 500 meters in diameter).

Note that, while the spacing between the parallel receiver lines is at least 500 meters (FIGS. 6A and 6B) or at least one kilometer (FIG. 6C), the particular spacing that is used may depend on various factors. These factors may include the water layer depth, the target depth and the orders of multiple reflections that are recorded appropriately.

FIGS. 7A-7D illustrate four exemplary layout patterns of receiver lines (i.e. sensor lines) for highly-sparse seabed acquisition in accordance with embodiments of the invention. For ease of illustration, the sensors on each receiver line are not depicted in FIGS. 7A-7D, but they are positioned on each receiver line in FIGS. 7A-7D in a similar manner as that shown in FIG. 6A.

As discussed above in relation to FIG. 6A, each receiver line includes a plurality of sensors arranged thereon. The distance between consecutive (adjacent) sensors on each receiver line may be, for example, 50 meters. Other distances between consecutive sensors may be used. A preferred range of the distance between consecutive sensors is from 25 to 100 meters for OBC and 100 to 400 meters for OBN.

Figure 7A:
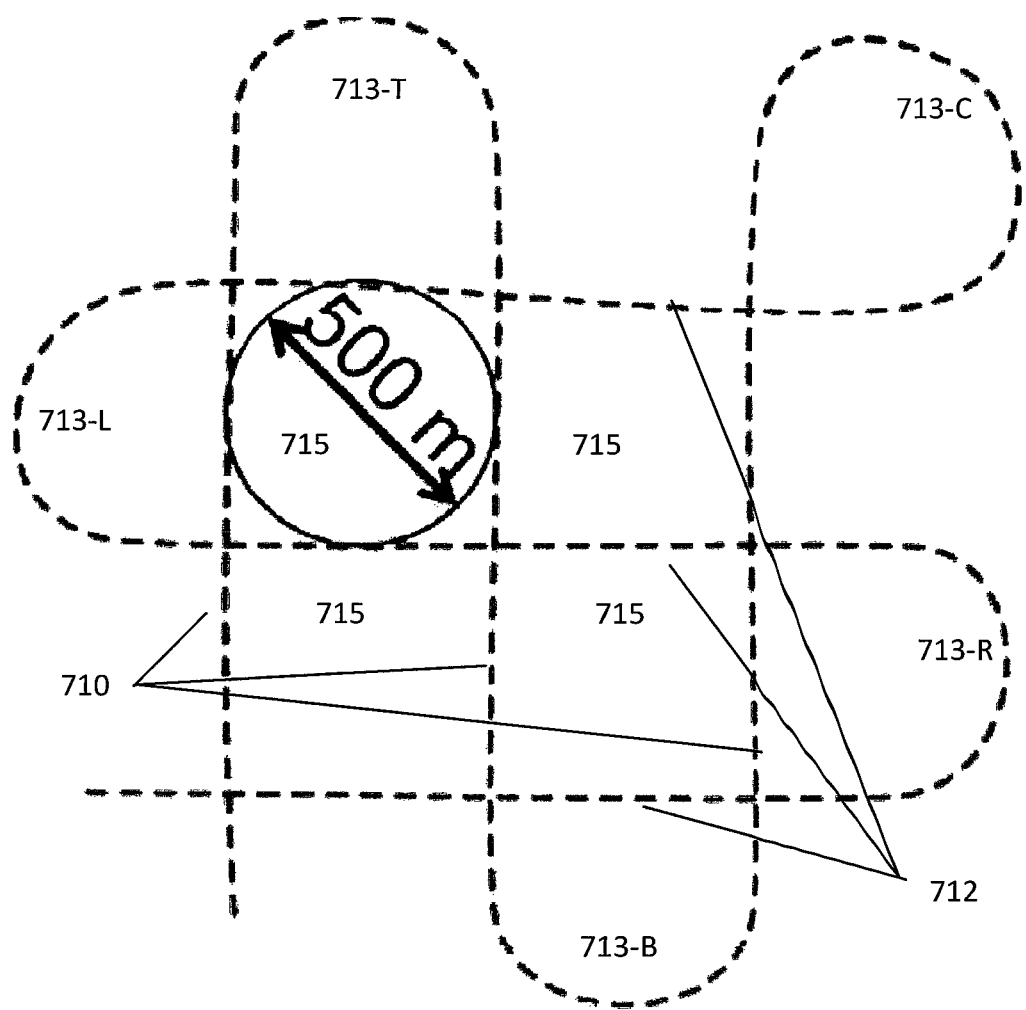
FIG. 7A illustrates a first exemplary layout pattern of sensor lines for highly-sparse seabed acquisition in accordance with embodiments of the invention.

In FIG. 7A, a single receiver line is arranged in a pattern that forms a 2D array of cells 715. Each cell 715 is bordered by two adjacent vertical receiver lines 710 and two adjacent horizontal receiver lines 712. A circle with a diameter of at least 500 meters may be fit into each cell 715, where the area of the circle does not include any sensors.

The pattern in FIG. 7A also includes external "leaf" (or "turnaround") segments 713. These leaf segments are curved segments that connect to ends of horizontal and/or vertical line segments in the pattern. In particular, five types of leaf segments 713 are depicted (left 713-L, right 713-R, top 713-T, bottom 713-B, and corner 713-C). A left leaf segment 713-L connects two consecutive horizontal receiver lines 712 on the left side of the 2D array. A right leaf segment 713-R connects two consecutive horizontal receiver lines 712 on the right side of the 2D array. A top leaf segment 713-R connects two consecutive vertical receiver lines 710 on the top side of the 2D array. A bottom leaf segment 713-B connects two consecutive vertical receiver lines 710 on the bottom side of the 2D array. Finally, a corner leaf segment 713-C connects a vertical receiver line 710 to a horizontal receiver line 712 at a corner of the 2D array.

Figure 7B:
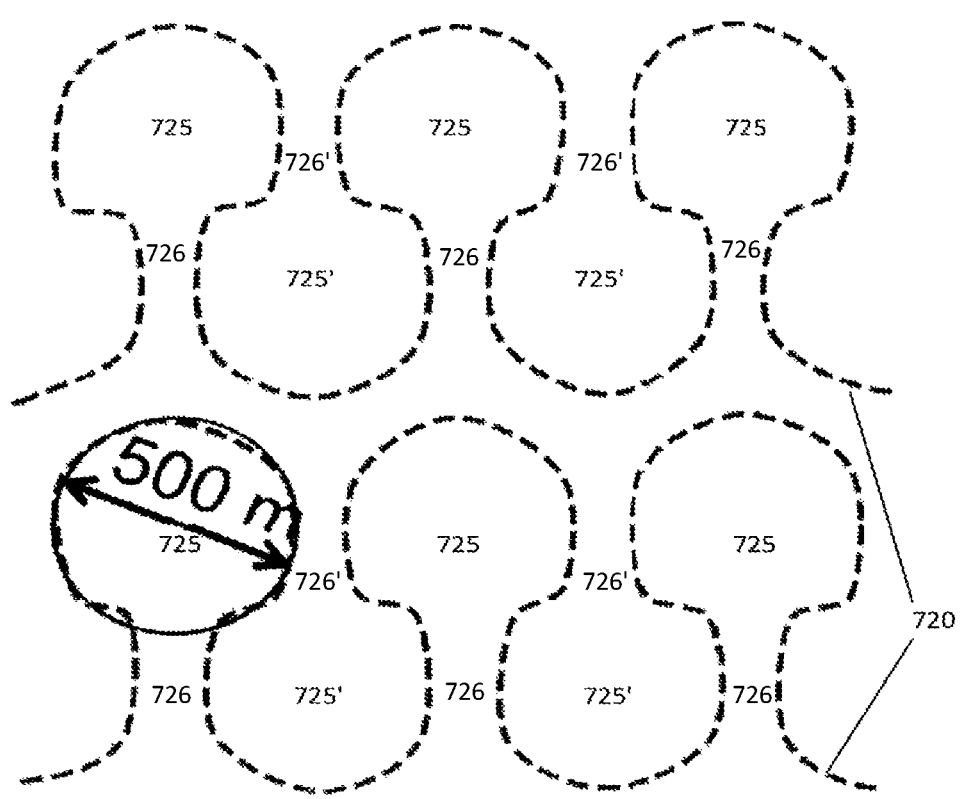
FIG. 7B illustrates a second exemplary layout pattern of sensor lines for highly-sparse seabed acquisition in accordance with embodiments of the invention.

In FIG. 7B, multiple receiver lines 720 are shown, where each receiver line 720 is arranged in a 2D pattern that forms round "head" and thin "neck" regions. Each head region is sufficiently large in area to fit a circle that is 500 meters in diameter or larger.

As shown in FIG. 7B, each receiver line 720 is curved to form the left side of a thin neck region 726, then the left side of a round head region 725, then the right side of the head region 725, and then the right side of the neck region 726. The pattern then repeats. Between each two consecutive neck regions 726 is formed a "mirror-image" head region 725', and between each two consecutive head regions 725 is formed a "mirror-image" neck region 726'. Each mirror-image head region 725' is also sufficiently large in area to fit a circle that is 500 meters in diameter or larger. The head and mirror-image head regions may be considered to be the cells of the array.

Figure 7C:
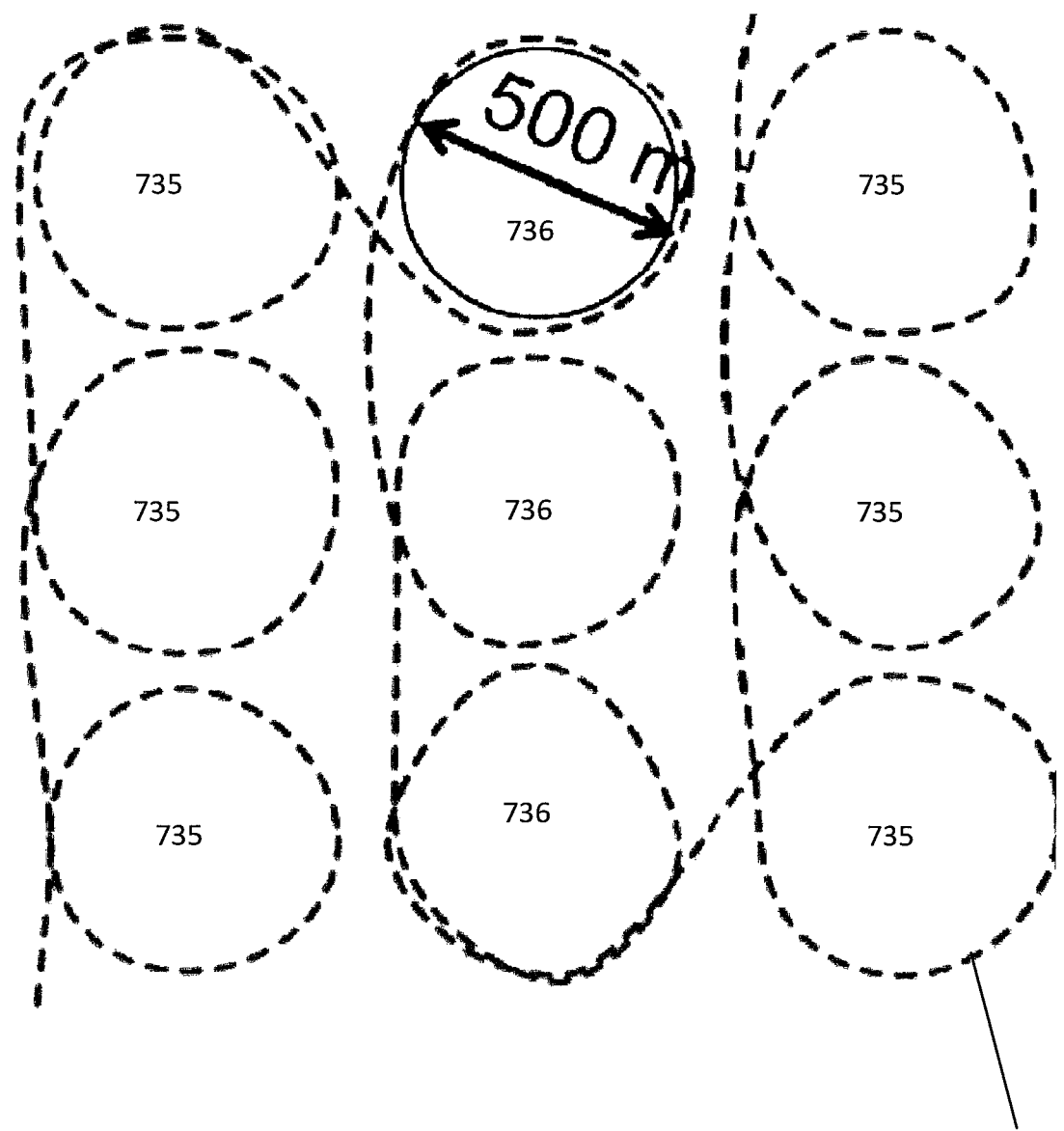
FIG. 7C illustrates a third exemplary layout pattern of sensor lines for highly-sparse seabed acquisition in accordance with embodiments of the invention.

In FIG. 7C, a single receiver line 730 is arranged in a 2D pattern that forms a 2D array of loops. A circle with a diameter of at least 500 meters may be fit into the interior region of each loop, where the area of the circle does not include any sensors.

As depicted, the 2D array of loops may include alternating "clockwise" and "counter-clockwise" columns. Consider laying out the receiver line 730 starting from the lower-left corner of FIG. 7C. The first column of loops formed includes clockwise loops 735 in that the receiver line 730 is laid out in a clockwise direction. The second column of loops formed includes counter-clockwise loops 736 in that the receiver line 730 is laid out in a counter-clockwise direction. The third column of loops formed includes clockwise loops 735 in that the receiver line 730 is laid out in a clockwise direction. And so on.

Figure 7D:
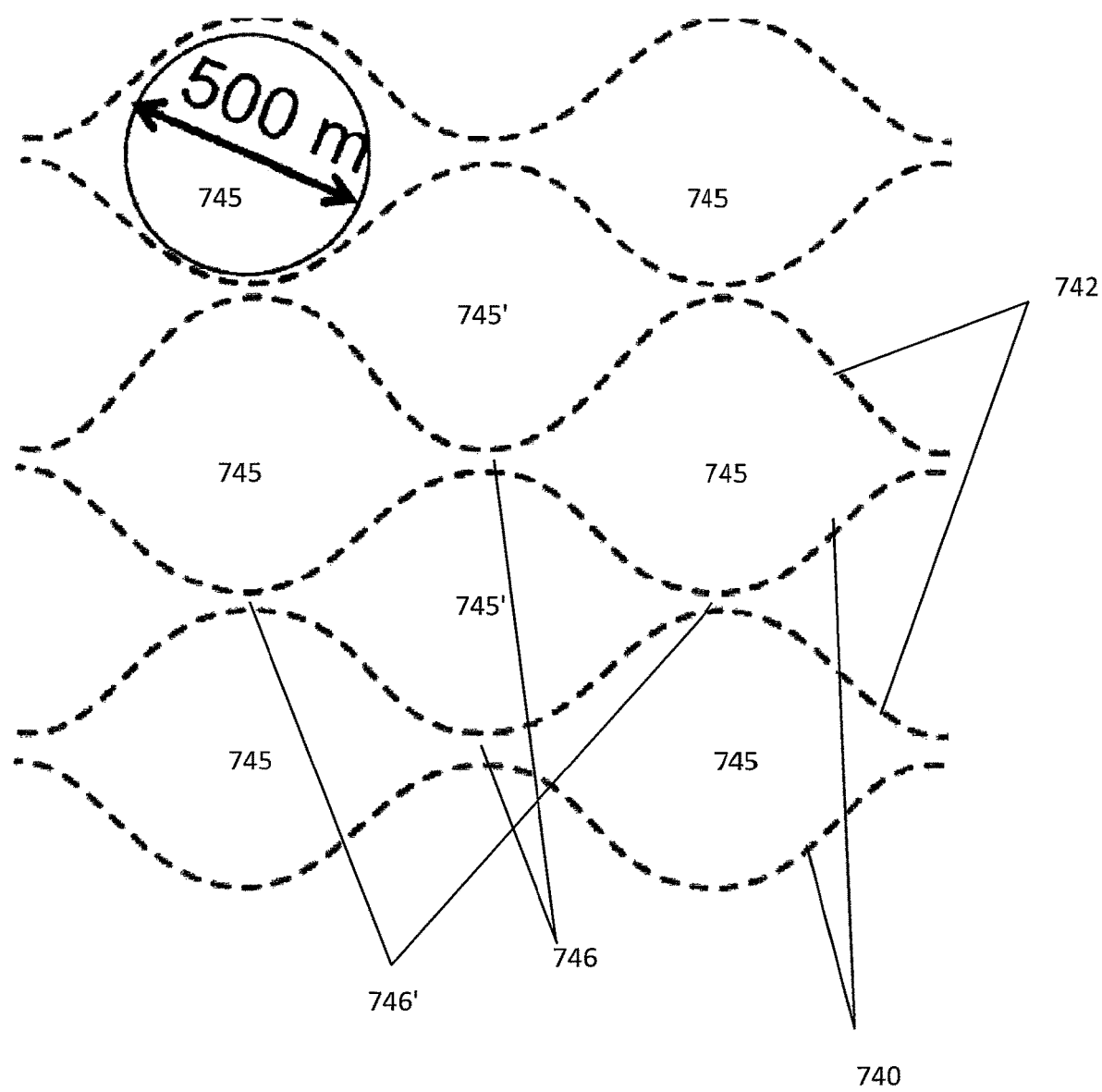
FIG. 7D illustrates a fourth exemplary layout pattern of sensor lines for highly-sparse seabed acquisition in accordance with embodiments of the invention.

In FIG. 7D, multiple receiver line pairs (740/742) are shown, where each receiver line pair forms a row of alternating round "bulge" 745 and thin "neck" 746 regions. Each bulge region 745 is sufficiently large in area to fit a circle that is 500 meters in diameter or larger.

As shown in FIG. 7D, each receiver line pair includes a bottom line 740 and a top line 742. These lines curve to form the alternating bulge 745 and neck 746 regions. As further shown, between each two consecutive receiver line pairs (740/742) is formed a "mirror-image" row of alternating bulge 745' and neck 746' regions. Each mirror-image bulge region 745' is also sufficiently large in area to fit a circle that is 500 meters in diameter or larger.

Figure 7E:
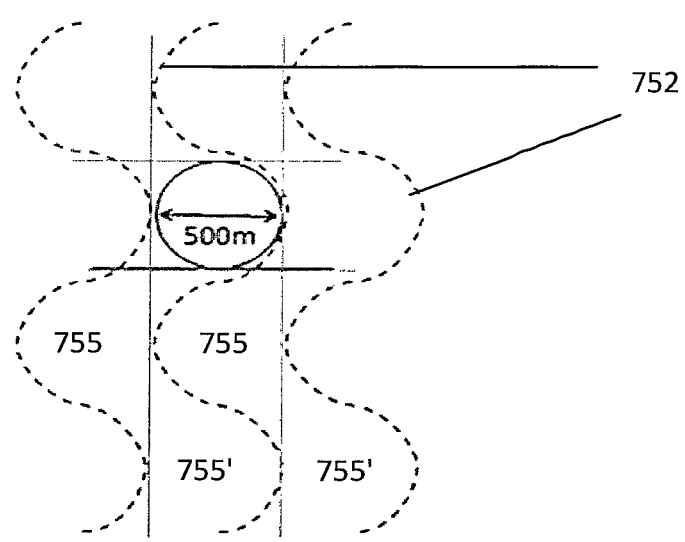
FIG. 7E illustrates a fifth exemplary layout pattern of sensor lines for highly-sparse seabed acquisition in accordance with embodiments of the invention.

In FIG. 7E, the receiver lines (752) are arranged in an "in-phase wave" pattern. As depicted, each receiver line (752) is arranged in an oscillating wave-like arrangement. In the diagram, the oscillations alternate going to the left and the right.

The left oscillations form a row of left-side "pockets" (755), each left-side pocket (755) being sufficiently large in area to fit a circle that is 500 meters in diameter or larger. Similarly, the right oscillations form a row of right-side "pockets" (755'), each right-side pocket (755') also being sufficiently large in area to fit a circle that is 500 meters in diameter or larger. The rows of left-side and right-side pockets alternate in the overall pattern.

The pattern in FIG. 7E is an in-phase wave pattern in that the wave shape of each receiver line is aligned in phase to the wave shapes of the other receiver lines. In comparison, the pattern in FIG. 7D may be considered to be an out-of-phase (by 180 degrees) wave pattern.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method of performing a marine seismic survey, the method comprising:
   deploying a plurality of geophysical sensors in an arrangement on a seabed, wherein the arrangement has a distance between consecutive geophysical sensors in a range from 25 meters to 400 meters and forms an array of two-dimensional cells, and wherein each cell in the array has an interior region that contains no geophysical sensors and is sufficiently large in area such that a 500 meter diameter circle may be inscribed therein;
   generating a seismic signal using a signal source that is towed by a survey vessel; and
   recording seismic data using the plurality of geophysical sensors.

2. The method of claim 1, wherein the arrangement deployed comprises:
   a plurality of lines upon which the plurality of geophysical sensors are arranged,
   wherein the plurality of lines are parallel to each other, and
   wherein each cell in the array comprises a stripe region between adjacent lines.

3. The method of claim 1, wherein the arrangement deployed further comprises:
   a first plurality of lines and a second plurality of lines upon which the plurality of geophysical sensors are arranged,
   wherein the first plurality of lines are parallel to each other,
   wherein the second plurality of lines are parallel to each other and are perpendicular to the first plurality of lines, and wherein each cell in the array comprises a rectangular region bordered by two adjacent lines of the first plurality and two adjacent lines of the second plurality.

4. The method of claim 3, wherein each cell in the array is sufficiently large in area such that one kilometer diameter circle may be inscribed therein.

5. The method of claim 1, wherein the arrangement deployed further comprises:
at least one line upon which the plurality of geophysical sensors are arranged,
wherein the at least one line forms the array of cells, and
wherein the at least one line includes a curved segment that connects two parallel line segments that are arranged in a first direction.

6. The method of claim 5,
wherein the array of cells is a two-dimensional array of rectangular cells, and
wherein the at least one line further includes:
a curved segment that connects two parallel line segments that are arranged in a second direction that is perpendicular to the first direction; and
a curved segment that connects a line segment that is arranged in the first direction to a line segment that is arranged in the second direction.

7. The method of claim 1, wherein the arrangement deployed further comprises:
at least one line upon which the plurality of geophysical sensors are arranged,
wherein the at least one line forms an array of head and neck regions,
wherein between two consecutive head regions is formed a mirror-image neck region, and
wherein between two consecutive neck regions is formed a mirror-image head region.

8. The method of claim 1, wherein the arrangement deployed further comprises:
at least one line upon which the plurality of geophysical sensors are arranged, and
wherein the at least one line forms an array of loop regions.

9. The method of claim 8,
wherein the array of loop regions comprises alternating columns of clockwise loop regions and counter-clockwise loop regions.

10. The method of claim 1, wherein the arrangement deployed further comprises:
a plurality of pairs of lines upon which the plurality of geophysical sensors are arranged,
wherein each pair of lines forms an alternating sequence of bulge and neck regions,
wherein between corresponding bulge regions of two adjacent pairs of receiver lines is formed a mirror-image neck region, and
wherein between corresponding neck regions of two adjacent pairs of receiver lines is formed a mirror-image bulge region.

11. The method of claim 1, wherein the arrangement deployed further comprises:
a plurality of lines upon which the plurality of geophysical sensors are arranged,
wherein each line forms a wave shape.

12. The method of claim 11, wherein the wave shapes of the plurality of lines are arranged so as to be in-phase with each other.

13. The method of claim 1, wherein the geophysical sensor are deployed using ocean bottom cables.

14. The method of claim 1, wherein the geophysical sensors are deployed using ocean bottom nodes.

15. The method of claim 1, further comprising:
generating a seismic signal using a signal source towed by a survey vessel.

16. The method of claim 1, further comprising:
generating a seismic signal using a signal source on an underwater vehicle.

17. The method of claim 1, further comprising:
determining, by a computer system, a seismic gather for a location in a geophysical formation, wherein the seismic gather includes one or more source definitions and one or more sensor definitions;
modifying, by the computer system, the seismic gather by interchanging one or more source and sensor definitions for the seismic gather; and
imaging, by the computer system, the location using the modified gather, wherein the imaging uses higher-order reflections recorded in the seismic gather.

18. The method of claim 1, wherein the plurality of geophysical sensors are deployed in a region that includes a subsea installation.

19. The method of claim 1, further comprising:
repeating the generating and the recording periodically to monitor a hydrocarbon reservoir under the sea floor.

20. A method of manufacturing a geophysical data product, the method comprising:
obtaining a seismic signal acquired using at least one signal source and a plurality of geophysical sensors in an arrangement on a seabed, wherein the arrangement has a distance between consecutive geophysical sensors in a range from 25 meters to 400 meters and forms an array of two-dimensional cells, and wherein each cell in the array has an interior region that contains no geophysical sensors and is sufficiently large in area such that a 500 meter diameter circle may be inscribed therein;
determining, by a computer system, a seismic gather for a location in a geophysical formation, wherein the seismic gather includes one or more source definitions and one or more sensor definitions;
modifying, by the computer system, the seismic gather by interchanging one or more source and sensor definitions for the seismic gather; and
generating image data the location using higher-order reflections and the modified gather; and
recording the image data on a tangible data storage medium.

* * * * *